(12) United States Patent
Rozmaryn

(10) Patent No.: US 8,880,948 B2
(45) Date of Patent: Nov. 4, 2014

(54) TERMINAL DIAGNOSIS SELF CORRECTION METHOD AND SYSTEM

(75) Inventor: Jack Rozmaryn, Silver Spring, MD (US)

(73) Assignee: Hughes Network Systems LLC, Germantown, MD (US)

( * ) Notice: Subject to any disclaimer, the term of this patent is extended or adjusted under 35 U.S.C. 154(b) by 148 days.

(21) Appl. No.: 13/536,610

(22) Filed: Jun. 28, 2012

(65) Prior Publication Data

US 2014/0006869 A1    Jan. 2, 2014

(51) Int. Cl.
    *G06F 11/00*      (2006.01)

(52) U.S. Cl.
    USPC ............................................. 714/27

(58) Field of Classification Search
    CPC ............ G06F 11/2294; G06F 11/0748; G06F 11/2268; G06F 11/2733
    See application file for complete search history.

(56) References Cited

U.S. PATENT DOCUMENTS

| | | | |
|---|---|---|---|
| 5,491,791 A * | 2/1996 | Glowny et al. | 714/37 |
| 6,445,916 B1 | 9/2002 | Rahman | |
| 6,847,817 B2 | 1/2005 | Hadinger et al. | |
| 8,700,957 B2 * | 4/2014 | La Fever et al. | 714/30 |
| 2003/0054816 A1 | 3/2003 | Krebs et al. | |
| 2004/0199573 A1 * | 10/2004 | Schwartz et al. | 709/201 |
| 2006/0084377 A1 | 4/2006 | Lee et al. | |
| 2008/0055152 A1 | 3/2008 | Hudson et al. | |
| 2010/0150017 A1 | 6/2010 | Choo | |
| 2010/0223491 A1 * | 9/2010 | Ladd et al. | 714/2 |
| 2011/0143654 A1 | 6/2011 | Mukhija | |

* cited by examiner

*Primary Examiner* — Charles Ehne
(74) *Attorney, Agent, or Firm* — K&L Gates LLP

(57) ABSTRACT

Terminal diagnosis self correction is disclosed. A service inquiry is received regarding a problem with a terminal from a user. Terminal statistics are obtained remotely from the terminal and stored in a site diagnosis log. An initial diagnosis is determined with a site diagnostic tool using the terminal statistics. The initial diagnosis is stored in the site diagnosis log. A technician is dispatched to repair the terminal. Terminal statistics are obtained locally at the terminal and stored in an onsite validation tool log. An onsite diagnosis is determined using an onsite validation tool and stored the onsite validation tool log. The initial and onsite diagnoses are compared. In response to a difference between the initial and onsite diagnoses, the remotely and locally obtained terminal statistics are compared. The site diagnostic tool is adjusted based on the initial diagnosis, the onsite diagnosis, and the remote and local terminal statistics.

20 Claims, 5 Drawing Sheets

TERMINAL DIAGNOSIS SELF CORRECTION METHOD AND SYSTEM

CROSS REFERENCE TO RELATED APPLICATIONS

The present application relates to the following co-pending patent applications: "Problem Signature Terminal Diagnosis Method and System," filed on Jun. 28, 2012, as U.S. patent application Ser. No. 13/536,600, and "Peer Group Diagnosis Detection Method and System," filed on Jun. 28, 2012, as U.S. application Ser. No. 13/536,604, the entire contents of each of which are incorporated by reference herein.

BACKGROUND

Wireless communication systems typically include a plurality of user terminals that are used by customers or end users which transmit and receive data from satellites and/or other antennas. For a satellite based communication system, a satellite terminal is typically set up at the user location by a service technician or installer. For example, a user's home may have a satellite dish installed for receiving internet, telephone, and television service, or the like. The satellite dish is installed with associated hardware, such as a transmitter, receiver, modem, router, set-top box, and the like. The service technician configures the terminal for optimal use, for example, by correctly orienting the satellite dish, configuring all settings appropriately, and testing the terminal to ensure it is working properly before leaving the installation.

Typically, when a customer of a satellite communication system has a problem with the service (e.g., service interruption, pixilation, slow internet), the customer calls a customer service hotline and speaks with a customer service representative. Typically, the customer service representative would attempt to determine if there is a simple problem that can be addressed by the customer, such as by resetting or powering down the receiver. The customer service representative usually determines what questions to ask the customer and what actions should be taken by the customer using a diagnostic tool. If a simple solution is not found going through the designated questions and actions, a repair technician may be sent on a repair call to the terminal at the customer's home. The customer's responses to the customer service representative may lead to an initial diagnosis, which may dictate dispatching a repair technician, mailing a component to the customer for replacement, or that no action is needed, for example, when the service interruption is caused by weather conditions or a regional service interruption. However, in many cases when a repair technician is dispatched, a repair call may not actually be necessary. Typically, a diagnostic tool is not revised or refined often because the process can be a tedious, time consuming, and inefficient exercise.

SUMMARY

The present disclosure provides a new and innovative method and system for terminal diagnosis self correction. In an example embodiment, a service inquiry is received relating to a problem with a terminal from a user. Terminal statistics are obtained remotely from the terminal and stored in a site diagnosis log. An initial diagnosis is determined with a site diagnostic tool using the terminal statistics and the initial diagnosis is stored in the site diagnosis log. A technician is dispatched to repair the terminal. Terminal statistics are obtained locally at the terminal and stored in an onsite validation tool log. An onsite diagnosis is determined using an onsite validation tool and stored the onsite validation tool log. The initial and onsite diagnoses are compared. In response to a difference between the initial and onsite diagnoses, the remotely and locally obtained terminal statistics are compared. The site diagnostic tool may be adjusted based on the initial diagnosis, the onsite diagnosis, the remote and local terminal statistics, and any corrective actions taken.

Additional features and advantages of the disclosed system, methods, and apparatus are described in, and will be apparent from, the following Detailed Description and the Figures.

DETAILED DESCRIPTION OF EXAMPLE EMBODIMENTS

Figure 1:
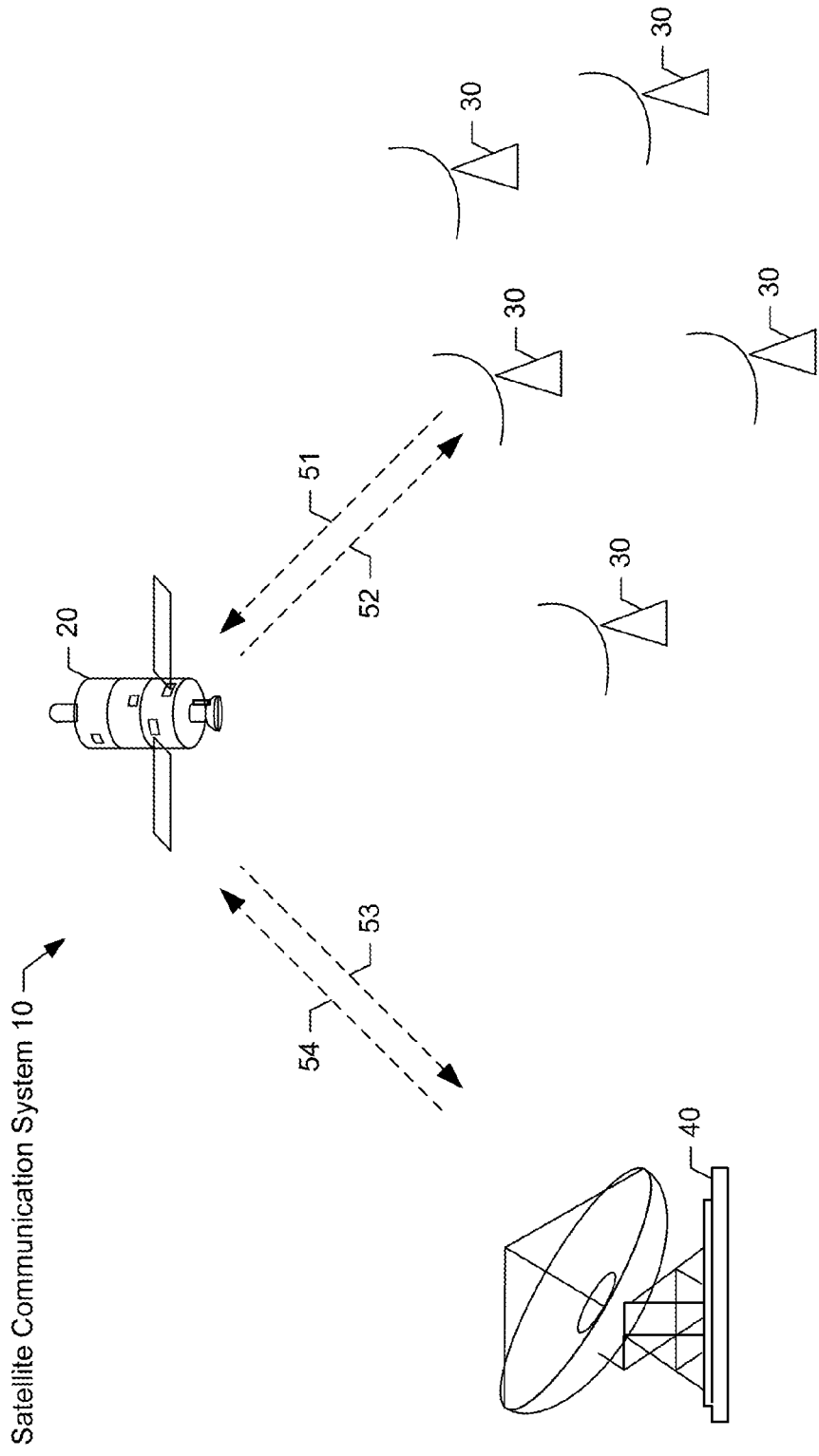
FIG. 1 is a high level block diagram of an example satellite communication system, according to an example embodiment of the present disclosure.

A high level block diagram of an example satellite communication system 10 is illustrated in FIG. 1. The illustrated system 10 includes a satellite 20 and satellite terminals 30, each including an antenna and associated hardware (e.g., receiver, transmitter, modem, router, computing device). The satellite terminals 30 may transmit and receive data to and from the satellite 20. Typically, a satellite 20 receives data from a hub terminal 40 which is distributed to many satellite terminals 30. It should be appreciated that a satellite terminal 30 may communicate with one or more satellites 20. Similarly, a satellite 20 may communicate with one or more hub terminals 40, and a hub terminal 40 may communicate with one or more satellites 20. Typically, a satellite 20 communicates with each satellite terminal 30 using an uplink channel 51 and a downlink channel 52, and also communicates with a satellite hub 40 using a downlink channel 53 and an uplink channel 54. The uplink channel 54 and downlink channel 52 may be referred to as a forward channel while the uplink channel 51 and downlink channel 53 may be referred to as a return channel. It should be appreciated that the uplink channels 51, 54 and downlink channels 52, 53 typically each operate in different frequency bands and with totally independent circuitry. Accordingly, for example, a satellite terminal 30 typically may transmit data on the uplink channel 51 at a first frequency and receive data on the downlink channel 52 at a second frequency. For a satellite terminal 30, the performance of the uplink channel 51 and the downlink channel 52 are typically both separately evaluated in determining a site diagnosis, as uplink data and downlink data each provide insight into any problems which may exist for the satellite terminal 30.

It should be appreciated that in order for a satellite 20 to communicate with a satellite terminal 30, the satellite terminal 30 must be configured correctly with a proper line of sight to the satellite 20. The satellite communication system 10 may be operating in any broadband network, for example, the $K_a$ band, the $K_u$ band, the C band, or the like. For example, satellite communication system 10 may be implemented on the SPACEWAY® and/or JUPITER™ platform. Accordingly, the system 10 may provide satellite coverage over a smaller area or larger area, for example, regional coverage may be dozens or hundreds of miles wide. Also, for example, the system 10 may provide continental coverage.

If the antenna alignment of the satellite terminal 30 is not within a certain tolerance, transmission and/or reception of data may degrade and/or fail. However, even with proper antenna alignment, a satellite terminal 30 may have reception or transmission problems due to environmental issues such as inclement weather conditions. For example, rain fade is a common problem for certain frequency ranges (e.g., the $K_a$ band). Also, other interference sources, such as structures which may block a satellite terminal's 30 line of sight, may impede communication. Further, problems with terminal components and/or settings may cause signal degradation or failure. Components may fail or degrade for a variety of reasons (e.g., physical structural damage, short circuit). In some cases, a particular satellite terminal 30 may be experiencing multiple different problems simultaneously. Moreover, there are many potential causes of suboptimal communication for a satellite terminal 30, and it is often difficult to correctly diagnose the specific problem or problems a satellite terminal 30 may need corrected. Accordingly, for an operator of a satellite communication system 10, it may be highly advantageous to improve the accuracy of terminal diagnosis when a satellite terminal 30 is experiencing a problem with service.

It should be appreciated that satellite terminals 30, which may also be known as user terminals, earth terminals, ground stations, antenna sites, or the like, may be referred to in the present application simply as terminals or sites. Similarly, the terms customer service representative, customer service agent, and service agent may be used interchangeably in the present disclosure. Likewise, installer, service technician, repair technician, onsite technician and technician may be used interchangeably in the present disclosure. Also, customer, end user, and user may be used interchangeably in the present disclosure. Further, it should be appreciated that, the present application may provide example embodiments relating to a satellite based communication system 10 as illustrated in FIG. 1, however, the present disclosure is similarly applicable to other wireless communication systems, such as terrestrial communication systems.

Figure 2:
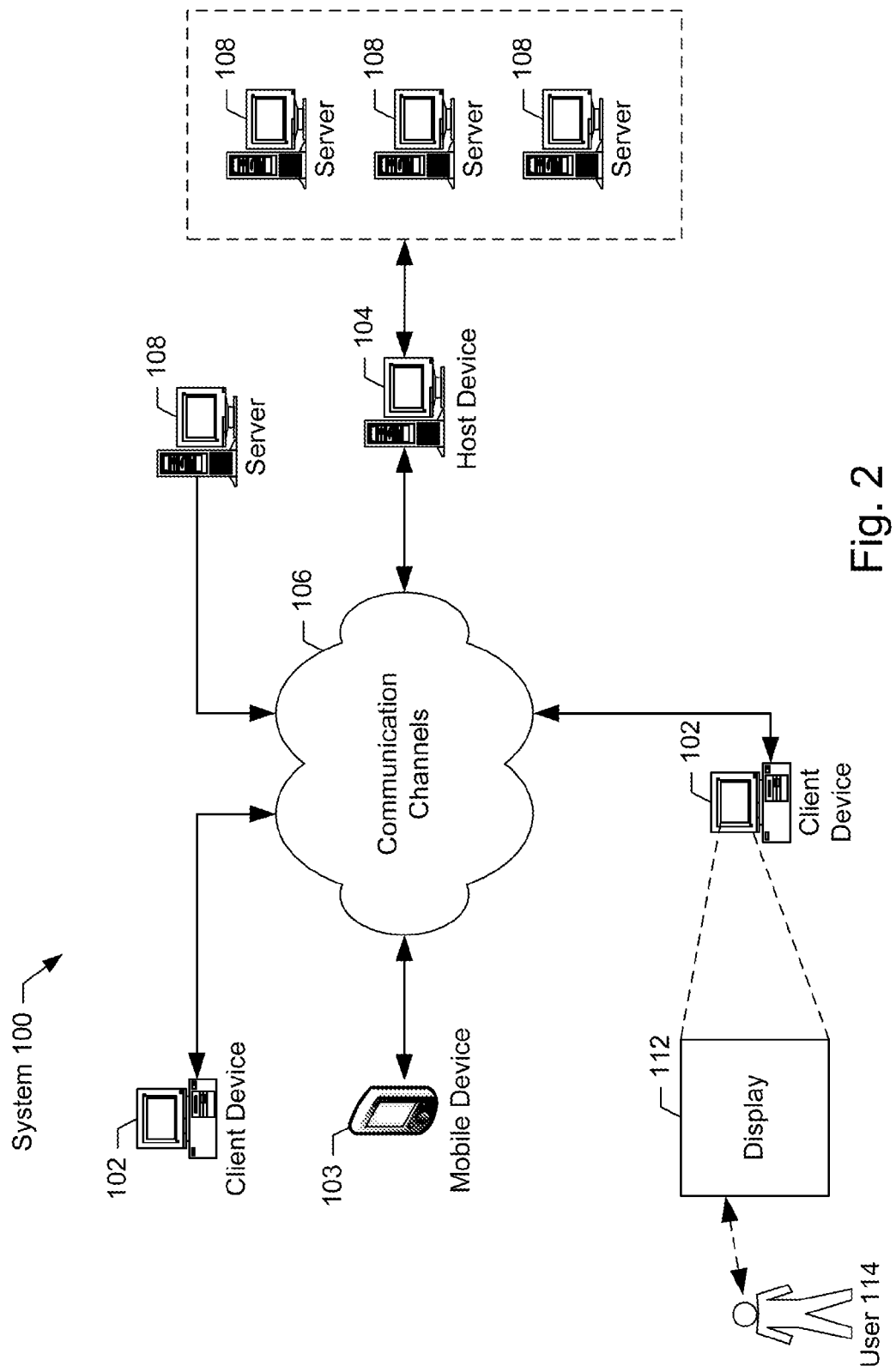
FIG. 2 is a high level block diagram of an example communication system, according to an example embodiment of the present disclosure.

A high level block diagram of an example network communications system 100 is illustrated in FIG. 2. The illustrated system 100 includes one or more client devices 102, one or more host devices 104, and one or more communication channels 106 (e.g., satellite communication). In a satellite communication system 10, the communication channels 106 include communication via the air interface between a hub terminal 40 and a satellite 20, and the satellite 20 and a satellite terminal 30. Also, for example, the hub terminal 40 may communicate with a host device 104 (e.g., content provider) and the satellite terminal 30 may communicate with a client device 102 (e.g., personal computer). Likewise, a hub terminal 40 and/or satellite terminal 30 may communicate with devices and/or networks that are not satellite based systems or not wireless (e.g., a local area network).

The system 100 may include a variety of client devices 102, such as desktop computers, televisions, and the like, which typically include a display 112, which is a user display for providing information to users 114, and various interface elements as will be discussed in further detail below. A client device 102 may be a mobile device 103, which may be a laptop computer, a tablet computer, a cellular phone, a personal digital assistant, etc. The client devices 102 may communicate with the host device 104 via a connection to one or more communications channels 106 such as the Internet or some other data network, including, but not limited to, any suitable wide area network or local area network. It should be appreciated that any of the devices described herein may be directly connected to each other instead of over a network. Typically, one or more servers 108 may be part of the network communications system 100, and may communicate with host servers 104 and client devices 102.

One host device 104 may interact with a large number of users 114 at a plurality of different client devices 102. Accordingly, each host device 104 is typically a high end computer with a large storage capacity, one or more fast microprocessors, and one or more high speed network connections. Conversely, relative to a typical host device 104, each typical client device 102 may often include less storage capacity, a single microprocessor, and a single network connection. It should be appreciated that a user 114 as described herein may include any customer, person, or entity which uses the presently disclosed system and may include a wide variety of parties for both business use and personal use.

Typically, host devices 104 and servers 108 store one or more of a plurality of files, programs, databases, and/or web pages in one or more memories for use by the client devices 102, and/or other host devices 104 or servers 108. A host device 104 or server 108 may be configured according to its particular operating system, applications, memory, hardware, etc., and may provide various options for managing the execution of the programs and applications, as well as various administrative tasks. A host device 104 or server may interact via one or more networks with one or more other host devices 104 or servers 108, which may be operated independently. For example, host devices 104 and servers 108 operated by a separate and distinct entities may interact together according to some agreed upon protocol.

Figure 3:
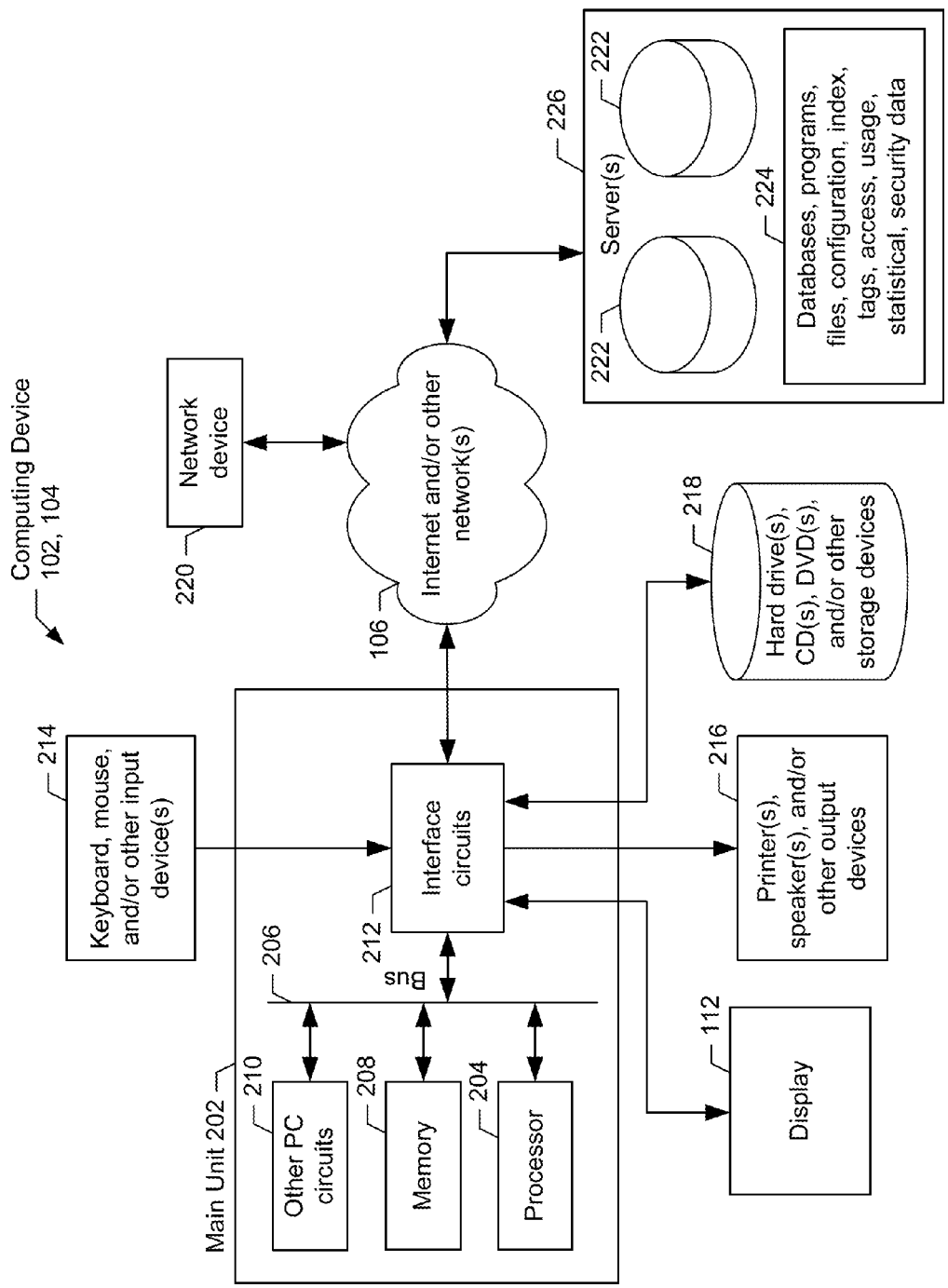
FIG. 3 is a detailed block diagram of an example a computing device, according to an example embodiment of the present disclosure.

A detailed block diagram of the electrical systems of an example computing device (e.g., a client device 102, a host device 104) is illustrated in FIG. 3. In this example, the computing device 102, 104 includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors. The memory 208 preferably includes volatile memory and non-volatile memory. Preferably, the memory 208 stores a software program that interacts with the other devices in the system 100 as described below. This program may be executed by the processor 204 in any suitable manner. In an example embodiment, memory 208 may be part of a "cloud" such that cloud computing may be utilized by a computing devices 102, 104. The memory 208 may also store digital data indicative of documents, files, programs, web pages, etc. retrieved from a computing device 102, 104 and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, remote control, track pad, track ball, isopoint, image sensor, character recognition, barcode scanner, microphone, and/or a speech or voice recognition system.

One or more displays 112, printers, speakers, and/or other output devices 216 may also be connected to the main unit 202 via the interface circuit 212. The display 112 may be a cathode ray tube (CRTs), a liquid crystal display (LCD), or any other type of display. The display 112 generates visual displays generated during operation of the computing device 102, 104. For example, the display 112 may provide a user interface that may display one or more web pages received from a computing device 102, 104. A user interface may typically include prompts for human input from a user 114 including links, buttons, tabs, checkboxes, thumbnails, text fields, drop down boxes, etc., and may provide various outputs in response to the user inputs, such as text, still images, videos, audio, and animations.

One or more storage devices 218 may also be connected to the main unit 202 via the interface circuit 212. For example, a hard drive, CD drive, DVD drive, and/or other storage devices may be connected to the main unit 202. The storage devices 218 may store any type of data, such as image data, video data, audio data, tag data, historical access or usage data, statistical data, security data, etc., which may be used by the computing device 102, 104.

The computing device 102, 104 may also exchange data with other network devices 220 via a connection to communication channel 106. Network devices 220 may include one or more servers 226, which may be used to store certain types of data, and particularly large volumes of data which may be stored in one or more data repository 222. A server 226 may include any kind of data 224 including databases, programs, files, libraries, configuration data, index or tag data, historical access or usage data, statistical data, security data, etc. A server 226 may store and operate various applications relating to receiving, transmitting, processing, and storing the large volumes of data. It should be appreciated that various configurations of one or more servers 226 may be used to support and maintain the system 100. For example, servers 226 may be operated by various different entities. Also, certain data may be stored in a client device 102 which is also stored on the server 226, either temporarily or permanently, for example in memory 208 or storage device 218. The network connection may be any type of network connection, for example, wireless connection, satellite connection, Bluetooth connection, Ethernet connection, digital subscriber line (DSL), telephone line, coaxial cable, etc.

Figure 4:
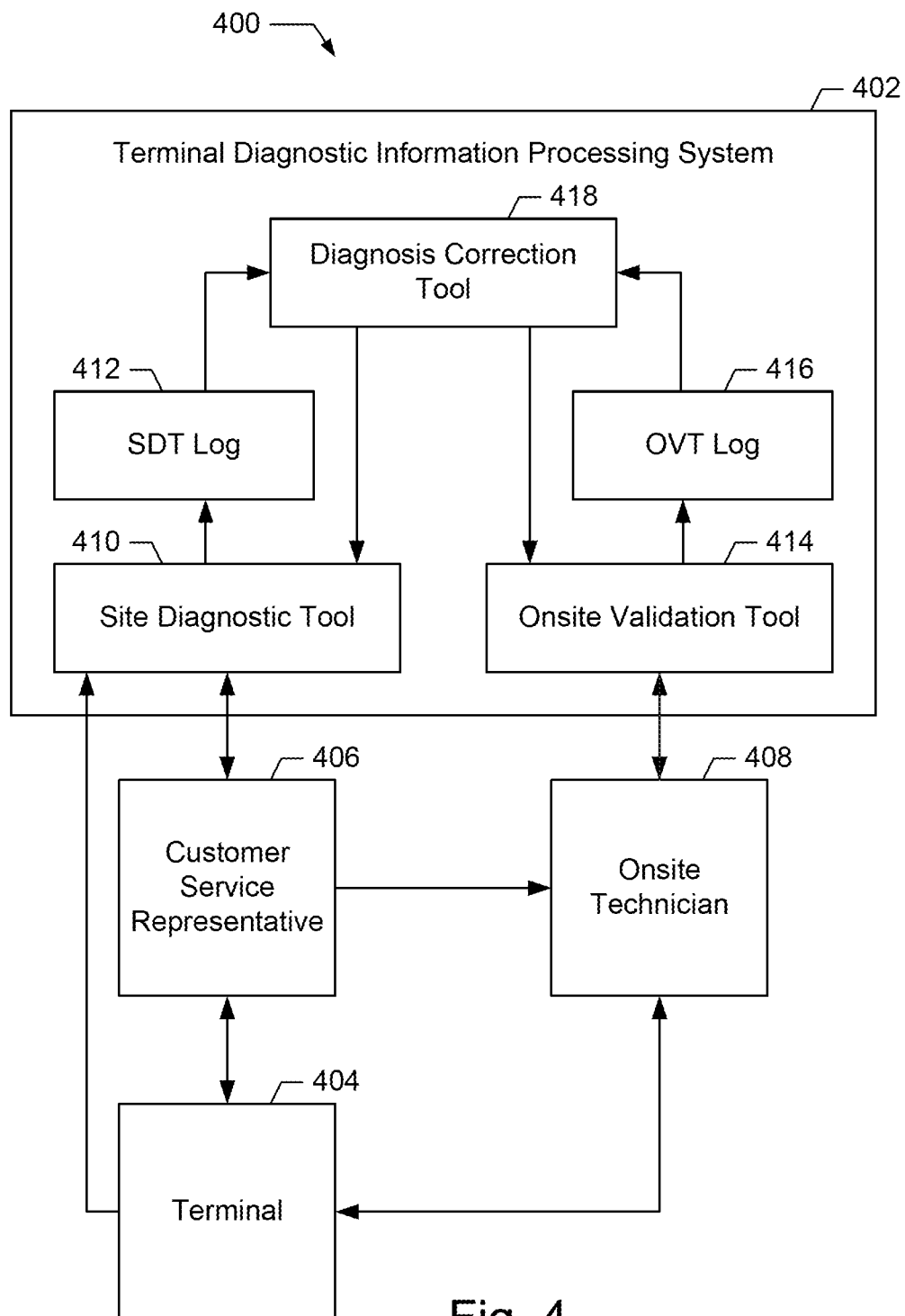
FIG. 4 is a block diagram of an example terminal diagnosis system, according to an example embodiment of the present disclosure.

FIG. 4 is a block diagram of an example terminal diagnosis system 400. The terminal diagnosis system 400 may include a terminal diagnostic information processing system 402, a terminal 404, a customer service representative 406, and an onsite technician 408. The terminal diagnostic information processing system 402 include a site diagnostic tool 410, a site diagnostic tool log ("SDT log") 412, an onsite validation tool 414, a onsite validation tool log ("OVT log") 416, and a diagnosis correction tool 418. It should be appreciated that the respective diagram blocks of FIG. 4 may represent one or more physical devices and/or a person (e.g., a repair technician and his measurement tools) for ease of understanding.

A terminal diagnostic information processing system 402 may be used, for example, by a company that provides satellite services, such as television, internet, telephone, etc., to customers, including home use customers, commercial businesses, and the like. The terminal diagnostic information processing system 402 is used to diagnose problems with a terminal 404 when a customer is experiencing a service interruption. In an example embodiment, the terminal diagnostic information processing system 402 may be implemented in a single central location such as a satellite service company, with a central processing computer system (e.g., host device(s) 104 and server(s) 108). Also, for example, the terminal diagnostic information processing system 402 may be configured in a distributed fashion where processing is performed at a separate location from data storage or the like. A customer service representative 406 may be a person located at a call center that fields calls from customers. The customer service representative 406 may ask the customer questions, diagnose the problem, and provide instructions to the customer to remedy the problem. If the customer service representative 406 cannot determine what the problem is or cannot solve a problem remotely, an onsite technician 408 may be dispatched to provide onsite assistance. The onsite technician 408 may perform various tests and measurements, and may accordingly adjust or replace components of the terminal (e.g., adjust antenna position, replace a fuse, change transmission settings).

The customer service representative 406 uses a site diagnostic tool 410 to diagnose the problem with the terminal 404. For example, a site diagnostic tool 410 may be provided via a host device 104, for example, in a customer service call center. The site diagnostic tool 410 may obtain real-time statistics for a variety of parameters of the terminal 404 (e.g., reception quality, transmission power). The customer service representative 406 may read questions from the site diagnostic tool 410, enter customer responses, and provide instructions to the customer based on an initial diagnosis of the site diagnostic tool 410 based on the real-time statistics and the customer's responses to questions and/or instructions. For example, the site diagnostic tool 410 may include problem signature libraries that are used to provide an initial diagnosis of a problem.

If necessary, an onsite technician 408 may be dispatched by the customer service representative 406, for example, a terminal 404 component (e.g., antenna, receiver, transmitter, modem) requires an adjustment or replacement. Also, a return merchandise authorization ("RMA") may be performed by sending the customer a component via mail or delivery service, for example, if the customer can easily switch the component out and there is no need for an onsite technician 408 to make a service call. It should be appreciated that unnecessary service calls may have significant costs. If performing an RMA will adequately address a problem and an onsite technician 408 is not needed, the RMA will save the cost of a service call. Accordingly, it is beneficial for the site diagnostic tool 410 to accurately diagnose as many problems as possible that may be solved with an RMA. Likewise, it should be appreciated that unnecessary RMAs may have significant costs. If an RMA will not fix the problem and an onsite technician 408 is needed to fix the problem, accurate initial diagnosis of a problem that requires a service call from an onsite technician 408 will save the unnecessary cost of an RMA. Further, if a problem may be fixed by the customer action (e.g., resetting or plugging in a receiver), an RMA and/or a service call is an unnecessary cost that may be eliminated with accurate initial diagnosis. Also, an accurate initial diagnosis can eliminate unnecessary replacement of hardware by the repair technician at the site. It should be appreciated that in some cases, the initial diagnosis will be incorrect, uncertain, or require confirmation. The site diagnostic tool 410 may provide all the terminal 404 statistics and the initial diagnosis to the SDT log 412 for analysis at a later time. The SDT log 412 may be persistently stored as a structured database, for example, in a dedicated server 108 remote from the site diagnostic tool 410.

When an onsite technician receives a dispatch call from the customer service representative 406, the initial diagnosis determined by the site diagnostic tool 410 may be communicated to the onsite technician 408, which may aid in quickly confirming the diagnosed problem, or if the diagnosis is uncertain, may allow for more efficient onsite diagnosis. The onsite validation tool 414 may confirm the diagnosis and/or determine the actual problem if the initial diagnosis was uncertain or incorrect. For example, the onsite technician 408 may use the onsite validation tool 414, which may provide instructions for the onsite technician 408 to perform (e.g., take measurements, run tests). All of the data from the measurements, tests, etc., may be transferred to the onsite validation tool 414 for analysis, and the onsite validation tool 414 may continue providing further instruction to the onsite technician 408 as needed until the problem is fully addressed with the terminal 404. The onsite validation tool 414 may provide all the terminal 404 statistics and the onsite diagnosis to the OVT log 416 for analysis, and for comparison with the SDT log 412 data by the diagnosis correction tool 418. The OVT log 416 may be persistently stored as a structured database, for example, in a dedicated server 108 remote from the onsite validation tool 414.

The diagnosis correction tool 418 may compare the data relating to the terminal 404 in the SDT log 412 with the data relating to the terminal 404 in the OVT log 416. For example, the initial diagnosis and all the terminal 404 statistics from the site diagnostic tool 410 may be compared with the onsite diagnosis and all the terminal 404 statistics from the onsite validation tool 414. Accordingly, by using the results of the onsite technician's 408 actions, the initial diagnosis detection performed by the site diagnosis tool 410 may be enhanced and refined.

Accordingly, the presently disclosed method and system may advantageously use automated feedback through information obtained from the repair technicians and is inputted into the diagnosis generation process. Continual enhancements and refinement to the site diagnosis used by the customer service agent to diagnose customer problems accurately, minimize false dispatches to the customer sites, and provide the technician with accurate recommended repair actions, which may reduce the technician's time on site. Additionally, the disclosed method and system may provide for early detection of systemic problems.

Figure 5:
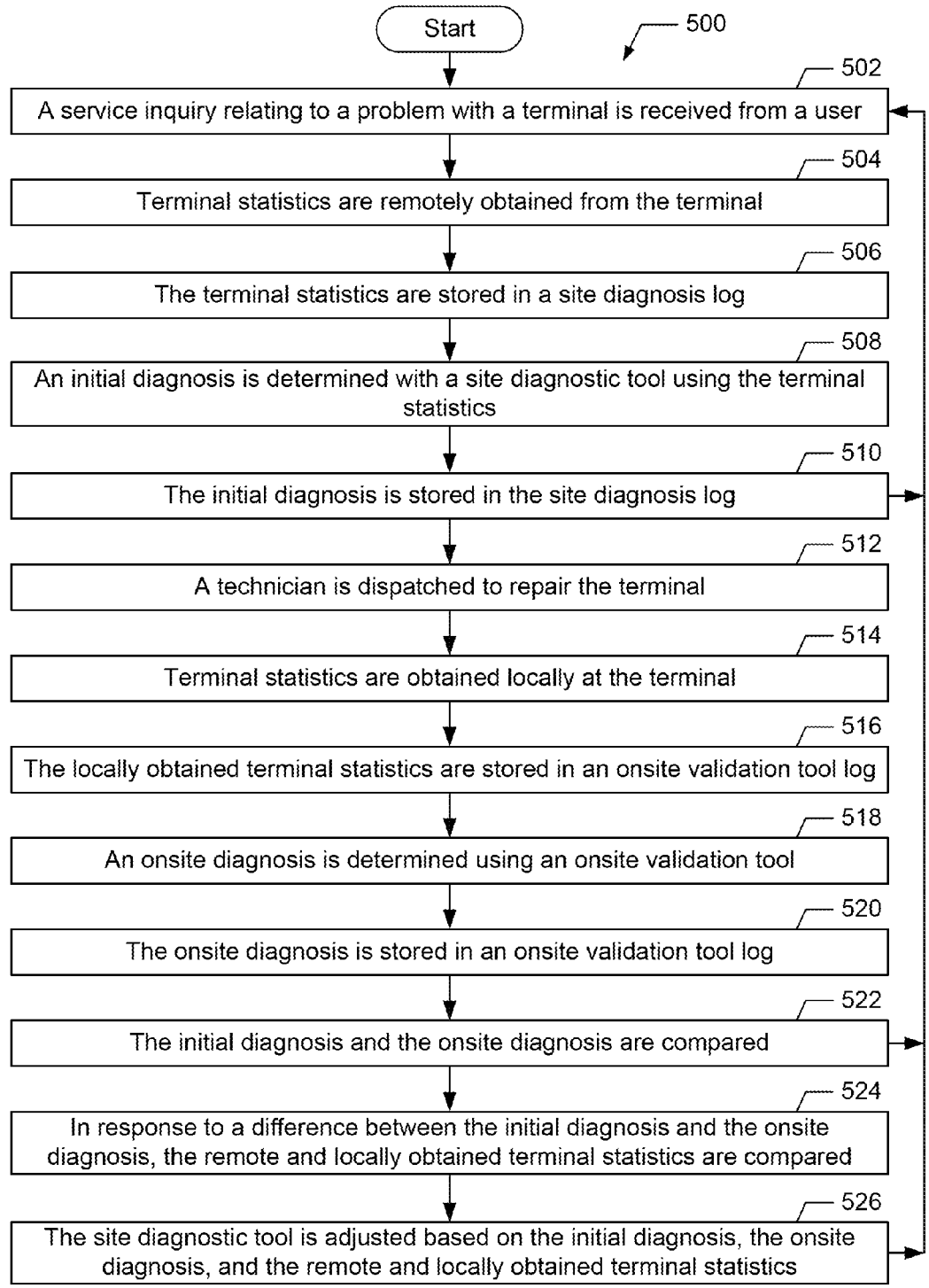
FIG. 5 includes a flowchart illustrating an example process for terminal diagnosis self correction, according to an example embodiment of the present disclosure.

FIG. 5 includes a flowchart of an example process 500 for terminal diagnosis self correction. Although the process 500 is described with reference to the flowchart illustrated in FIG. 5, it will be appreciated that many other methods of performing the acts associated with the process 500 may be used. For example, the order of many of the blocks may be changed, many blocks may be intermittently repeated or continually performed, certain blocks may be combined with other blocks, and many of the blocks described are optional or may only be contingently performed.

The example process 500 may begin when a service inquiry relating to a problem with a terminal is received from a user (block 502). For example, a customer's internet or television service is interrupted so the customer calls the service provider's customer service line. The terminal may be part of a communication system operating in any broadband network, for example, the $K_a$ band on the SPACEWAY® platform. Also, in an example embodiment, the communication system may be a terrestrial network. A customer service agent may take the call and start the process of determining what problems, if any, the terminal is experiencing. Also, for example, the service inquiry may be made via a web page, email, text message, or the like. The customer service agent may cause the terminal statistics to be remotely obtained from the terminal (block 504). For example, the terminal uploads all pertinent available data to upload to the site diagnostic tool. The terminal statistics may include equipment identification, current settings, and current and past measured data, for example, antenna type and size, reception power, transmission power, antenna gain, signal to noise ratio (Es/No), packet loss ratio, throughput speeds, and response times to name a few. For example, each of these parameters may be collected for both the uplink and the downlink. It should be appreciated that depending upon the particular communication system in use, different statistics may be more or less useful, but the statistics used provide the capability to diagnose problems with the terminal remotely, for example, by a customer service agent. Further, the units of measurement may vary and typical exemplary basic units may include watts, decibels, milliseconds, error rates, etc. The received terminal statistics are stored in a site diagnosis log (block 506). For example, the entire transmission of terminal statistics including current measurements and past measurements over a period of time prior to the uploading of data may be stored in the site diagnosis log.

An initial diagnosis is determined with a site diagnostic tool using the terminal statistics (block 508). For example, the customer service representative may read questions and instructions from the site diagnostic tool to the customer and enter the customer's responses to provide a remote diagnosis of the terminal. Terminal statistics and/or answers to questions may be compared to problem signature libraries to determine an initial diagnosis. For example, an initial diagnosis may determine that there is a problem with a certain component (e.g., receiver, transmitter, antenna) and may characterize a terminal as "degraded" or as "bad" depending upon the severity of the problem based on the problem signature libraries. Typically, for example, a bad terminal may provide significant service interruptions while a degraded terminal may provide limited service interruptions which may not even be noticeable to the customer or a reduction in internet throughput speed and response times for both the uplink and downlink. Accordingly, the initial diagnosis may include a determination of what the problem is and the severity of the problem (or problems). Further, the initial diagnosis may include information relating to any testing or measurements that an onsite technician may need to check or confirm to validate the initial diagnosis. The initial diagnosis is stored in the site diagnosis log (block 510). If the initial diagnosis does not require follow up (e.g., service call or RMA), the inquiry may be closed unless another service inquiry is received from the customer.

In some cases, based on the initial diagnosis, a technician is dispatched to repair the terminal (block 512). For example, if the initial diagnosis is that the terminal is bad because the power source of a transmitter is damaged, an onsite technician may be dispatched by the customer service agent to replace the transmitter. Once the technician is onsite, the terminal statistics are obtained locally at the terminal (block 514). For example, the onsite technician may use the onsite validation tool to provide step by step instructions to confirm that the initial diagnosis is correct, make the necessary component replacement, and test the repaired terminal to ensure the problem is fixed. It should be appreciated that the onsite technician may not require instruction from the onsite validation tool, and may also perform tests not requested by the onsite validation tool. The locally obtained terminal statistics are stored in an onsite validation tool log (block 516). For example, the terminal statistics are provided to the onsite validation tool log by the onsite technician when the repairs are completed. In an example embodiment, the locally obtained statistics may be loaded to the onsite validation tool log in real-time as the site repair is occurring.

The onsite diagnosis is determined using an onsite validation tool (block 518). For example, the onsite technician may perform various tests and measurements and the onsite validation tool may be used to confirm that the power supply of the transmitter is bad, and the technician may then make the necessary replacement. Once a replacement is made, the onsite validation tool may be used to confirm that the terminal is working properly and optimally. For example, using problem signature libraries, the onsite validation tool may confirm a problem of an initial diagnosis and then confirm correction of the problem following the repairs. In an example embodiment, once a repair is complete at a given site, a technician may complete a repair action report that lists the various possible actions to resolve the problem. For example, the possible and actually performed corrective actions including all intermediate steps, and all statistical data taken during the service call may be stored in the onsite validation tool. The onsite diagnosis is stored in an onsite validation tool log (block 520). It should be appreciated that with the stored onsite diagnosis, which may include any and all problems found or confirmed, all corrective actions taken by the onsite technician and confirmation of correction may also be stored in the onsite validation tool log.

The initial diagnosis and the onsite diagnosis are compared (block 522). For example, the initial diagnosis may be that a specific component (e.g., transmitter) failed and required replacement, and the onsite diagnosis may be different, for example, finding that a second component also was damaged and required replacement (e.g., transmitter and connector). If the initial diagnosis and the onsite diagnosis are a match, it indicates that the site diagnostic tool is accurately diagnosing the problem remotely, and the inquiry may be closed. However, when there is a discrepancy between the initial diagnosis and the onsite diagnosis, the site diagnostic tool may be able to be refined or improved. For example, the problem signature libraries may require updating. It should be appreciated that even if the initial diagnosis is nearly identical to the onsite diagnosis, there may be room for refinement in determining the initial diagnosis.

In response to a difference between the initial diagnosis and the onsite diagnosis, the remote and locally obtained terminal statistics are compared (block 524). For example, compared terminal statistics may include values such as the transmission power. Then, the site diagnostic tool is adjusted based on the initial diagnosis, the onsite diagnosis, and the remote and locally obtained terminal statistics (block 526). For example, the diagnosis correction tool may use the terminal statistics to determine that an initial diagnosis was not fully accurate due to an improper determination by the site diagnostic tool based on the transmission power, and accordingly, may update the site diagnostic tool for future service inquiries. The site diagnostic tool may also be adjusted based on whatever corrective actions were taken. For example, the diagnosis correction tool may adjust a threshold transmission power in the problem signature libraries based on corrective actions taken by the onsite technician.

In one example embodiment, the site diagnostic tool recognizes a site as a problem site. For example, if the ratio of the downlink deviation to uplink deviation (DL/UL) is greater than or equal to 2 and less than or equal to 5, the library problem signature may indicate that there is water in the radio. For example, this exemplary site has a DL/UL=2.5, and based on the problem signature libraries, the site diagnostic tool determines that water is leaking into the customer's radio. However, when a technician arrives at the site, the radio checks out as good, but the technician notices that there is partial blockage due to tree leaves in the line of site. A new problem signature is captured at the site, which may then be used to refine the original problem signature used in the initial diagnosis and may be added to the problem signature libraries by the diagnosis correction tool as a new partial blockage signature, for example, where DL/UL≥2 and DL/UL≤3 indicates a partial blockage of the line of sight. The problem signature for water leakage may be adjusted, for example, where DL/UL>3 and DL/UL≤5 is the new range of the DL/UL ratio for water leakage into the radio. Another exemplary feedback scenario is for a threshold correction. For example, a customer's radio is deemed bad at the site diagnostic tool because the signal to noise ratio (Es/No) is less than a certain number of decibels (e.g., 7.5 dB). However, a technician may arrive onsite and discover that the radio is good and that the signal quality factor was actually reduced due to weather fading. Accordingly, for example, a bad radio threshold at the site diagnostic tool may be reduced to accommodate the unexpected signal fading due to the weather (e.g., reduced to 7.0 dB). It should be appreciated that the signal quality factor varies with the season and therefore, may require threshold adjustment on a regular basis.

For exemplary purposes, the present disclosure discusses a various examples relating to a satellite communication system. However, it should be appreciated that the disclosed system, methods, and apparatus may be advantageously used in various different types of communication systems including, for example, systems that do not use satellites (e.g., a terrestrial point to point communication system).

It will be appreciated that all of the disclosed methods and procedures described herein can be implemented using one or more computer programs or components. These components may be provided as a series of computer instructions on any conventional computer readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

The invention is claimed as follows:

1. A method comprising:
receiving a service inquiry relating to a problem with a first terminal;
obtaining first terminal statistics remotely from the first terminal;
storing the first terminal statistics in a site diagnosis log;
determining an initial diagnosis with a site diagnostic tool using the first terminal statistics;
storing the initial diagnosis in the site diagnosis log;
dispatching a technician to repair the first terminal;
obtaining second terminal statistics locally at the first terminal;
storing the second terminal statistics in an onsite validation tool log;

determining an onsite diagnosis using an onsite validation tool;
storing the onsite diagnosis in the onsite validation tool log;
comparing the initial diagnosis and the onsite diagnosis;
comparing the first terminal statistics and the second terminal statistics in response to a difference between the initial diagnosis and the onsite diagnosis; and
adjusting the site diagnostic tool based on the initial diagnosis, the onsite diagnosis, the first terminal statistics, and the second terminal statistics.

2. The method of claim 1, wherein terminal statistics include uplink statistics and downlink statistics.

3. The method of claim 1, wherein terminal statistics include at least a reception power, a transmission power, and a signal to noise ratio.

4. The method of claim 1, wherein the initial diagnosis includes a characterization of at least one a component, an alignment, an uplink channel, and a downlink channel, as at least one of degraded and bad.

5. The method of claim 1, further comprising determining an onsite repair to resolve the problem.

6. The method of claim 1, further comprising storing corrective actions taken during an onsite repair to resolve the problem and adjusting the site diagnostic tool based on the corrective actions taken.

7. The method of claim 1, further comprising storing possible corrective actions based on an onsite diagnosis.

8. The method of claim 1, wherein a threshold used by the site diagnostic tool is modified.

9. The method of claim 1, wherein a range used by the site diagnostic tool is modified.

10. The method of claim 1, wherein a diagnosis correction tool automatically adjusts the site diagnostic tool.

11. A system comprising:
a computer readable medium storing terminal diagnostic information; and
at least one processing device operably coupled to the computer readable medium, the at least one processing device executing instructions to:
receive a service inquiry relating to a problem with a first terminal;
obtain first terminal statistics remotely from the first terminal;
store the first terminal statistics in a site diagnosis log;
determine an initial diagnosis with a site diagnostic tool using the first terminal statistics;
store the initial diagnosis in the site diagnosis log;
dispatch a technician to repair the first terminal;
obtain second terminal statistics locally at the first terminal;
store the second terminal statistics in an onsite validation tool log;
determine an onsite diagnosis using an onsite validation tool;
store the onsite diagnosis in the onsite validation tool log;
compare the initial diagnosis and the onsite diagnosis;
compare the first terminal statistics and the second terminal statistics in response to a difference between the initial diagnosis and the onsite diagnosis; and
adjust the site diagnostic tool based on the initial diagnosis, the onsite diagnosis, the first terminal statistics, and the second terminal statistics.

12. The system of claim 11, wherein terminal statistics include uplink statistics and downlink statistics.

13. The system of claim 11, wherein terminal statistics include at least a reception power, a transmission power, and a signal to noise ratio.

14. The system of claim 11, wherein the initial diagnosis includes a characterization of at least one a component, an alignment, an uplink channel, and a downlink channel, as at least one of degraded and bad.

15. The system of claim 11, further comprising determining an onsite repair to resolve the problem.

16. The system of claim 11, further comprising storing corrective actions taken during an onsite repair to resolve the problem and adjusting the site diagnostic tool based on the corrective actions taken.

17. The system of claim 11, further comprising storing possible corrective actions based on an onsite diagnosis.

18. The system of claim 11, wherein a threshold used by the site diagnostic tool is modified.

19. The system of claim 11, wherein a range used by the site diagnostic tool is modified.

20. The system of claim 11, wherein a diagnosis correction tool automatically adjusts the site diagnostic tool.

* * * * *